(No Model.) 2 Sheets—Sheet 1.
J. H. PENDLETON & C. TIERS.
TRACTION RAILWAY DEVICE.
No. 390,187. Patented Sept. 25, 1888.
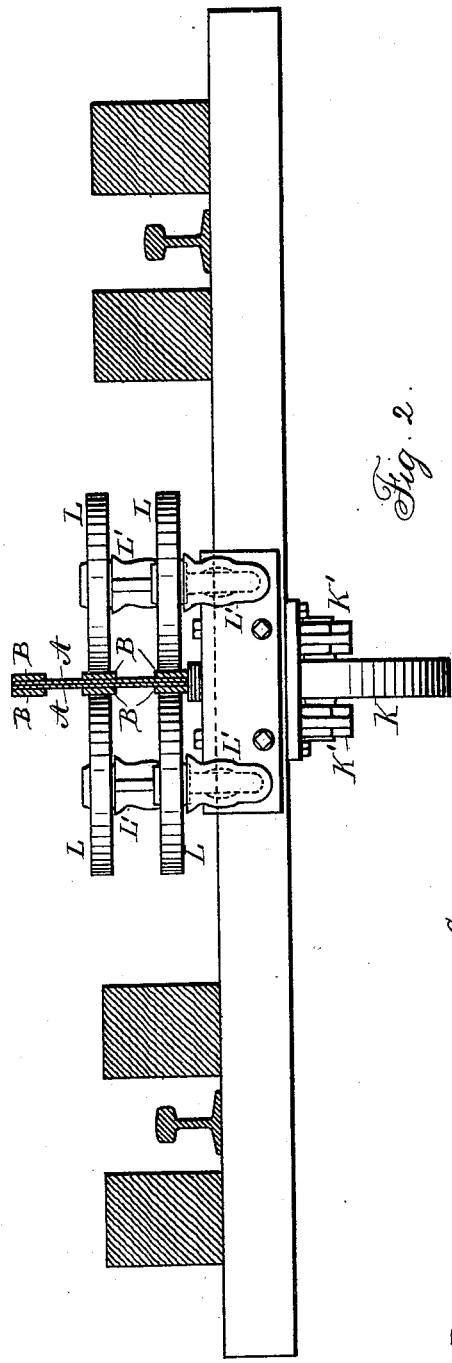
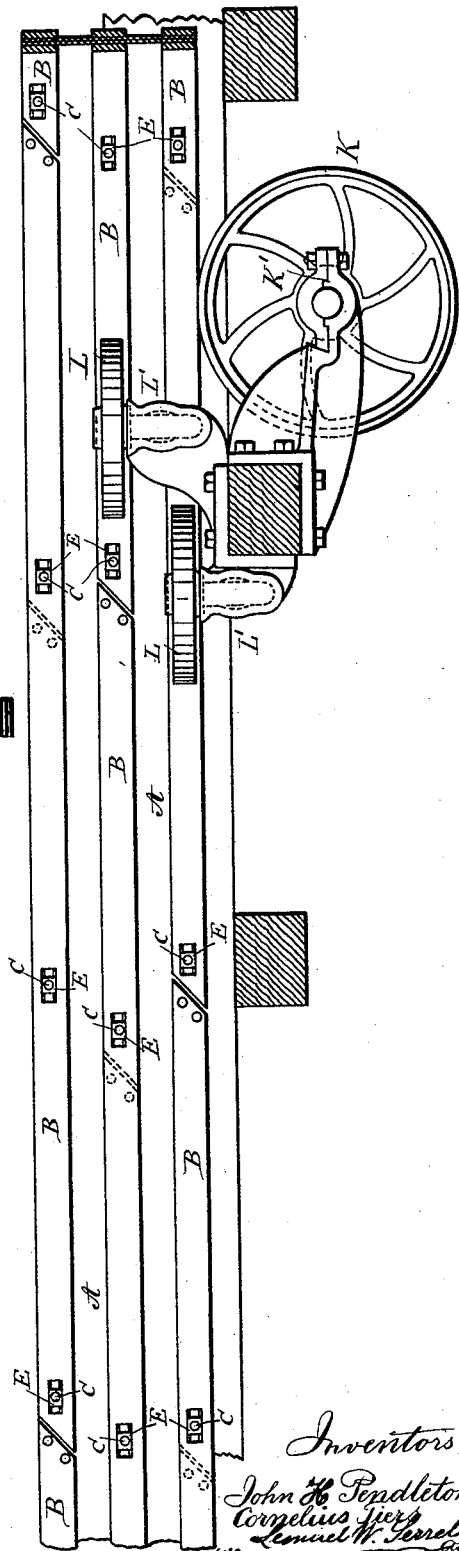
Witnesses:
J. Staib
Chas H Smith
Inventors
John H Pendleton
Cornelius Tiers
per Lemuel W Serrell Atty (No Model.) 2 Sheets—Sheet 2.
J. H. PENDLETON & C. TIERS.
TRACTION RAILWAY DEVICE.
No. 390,187. Patented Sept. 25, 1888.
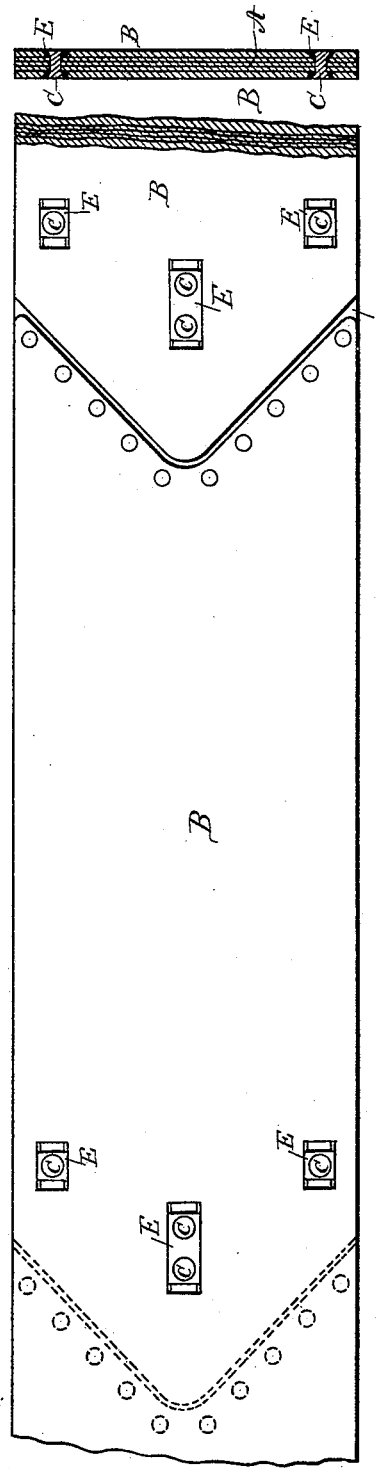
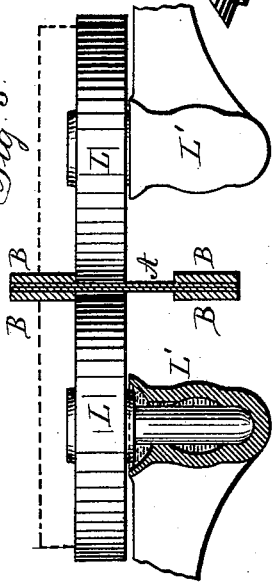
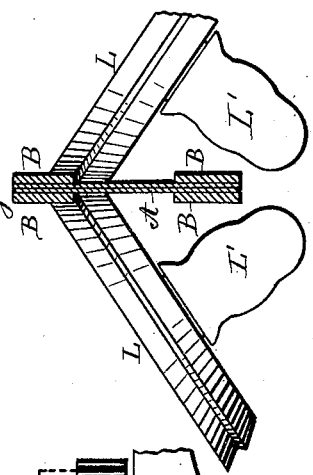
Witnesses:
J. Staib
Chr. H. Smith
Inventors:
John H. Pendleton
Cornelius Tiers
per Lemuel W. Serrell

UNITED STATES PATENT OFFICE.

JOHN H. PENDLETON, OF BROOKLYN, AND CORNELIUS TIERS, OF NEW YORK, ASSIGNORS, BY MESNE ASSIGNMENTS, TO THE RAPID TRANSIT CABLE COMPANY, OF NEW YORK, N. Y.

TRACTION-RAILWAY DEVICE.

SPECIFICATION forming part of Letters Patent No. 390,187, dated September 25, 1888.

Application filed March 1, 1886. Renewed June 13, 1888. Serial No. 276,928. (No model.)

*To all whom it may concern:*

Be it known that we, JOHN H. PENDLETON, of Brooklyn, in the county of Kings and State of New York, and CORNELIUS TIERS, of the city and State of New York, have invented an Improvement in Traction-Railway Devices, of which the following is a specification.

This improvement is for making use of an endless belt of sheet metal—such as steel—in place of a wire cable for traction-railways. This metallic belt is supported edgewise and provided with guard-plates, so that the wear is taken upon such guard-plates and the metallic belt is rendered very durable; and we make these guard-plates in such a manner that they do not interfere with the belt in passing around the driving-drums, and said belt is supported by guide-wheels so as to run between the railway-track rails or in a tunnel beneath the railway, or it is suspended overhead, so that a connection can be made from the same to a car upon the surface of the road.

In the drawings, Figure 1 is a cross-section of the belt and of the track and an elevation of the rollers supporting the belt. Fig. 2 is a side view of a portion of the belt and of the supporting-wheels. Fig. 3 is a side view of a modification of the belt. Fig. 4 is a cross-section of the same. Fig. 5 is a cross-section of a belt adapted to being suspended. The rollers for the same are in elevation; and Fig. 6 shows the same belt and conical rollers for supporting the same.

The belt itself is made of sheet metal of suitable weight and thickness, according to the strength required; but it contains two, three, or more thicknesses; and the lengths are so disposed that no two joints are adjacent to each other, and the belts may be connected together by rivets at any suitable distances apart; but usually it will only be necessary to employ the rivets, as hereinafter described, that pass through the sheet-metal belt and connect to the same the guard-plates.

We have shown in Fig. 1 a belt as containing two plates or ribbons, A, of sheet-steel, and in Fig. 4 three such plates.

The plates are protected by the guard-plates B. These plates are thicker than the belts or ribbons, A, of steel, and they are comparatively short in length, and there is a space left between the ends of these guard-plates, so as to allow the belt and guard-plates to bend or spring when passing around the driving-drums without the ends of the guard-plates closing tightly one against the other.

In Figs. 1 and 2 we have represented three lines of these guard-plates at opposite sides of the sheet-metal belt, and in Fig. 5 there are two such lines of guard-plates; but in Fig. 3 we have shown the guard-plates as of the same width as the belt or ribbon, A, of sheet-steel.

It is preferable in all cases to make the ends of the guard-plates diagonal, so that the gripping devices upon the cars and the supporting-rollers will rest upon the advancing end of the second plate before passing off the rear end of the first plate; and we make use of rivets C, passing through the belt A and through dovetail blocks E in correspondingly-shaped slots or mortises in the guard-plates, the slots being longer than the blocks, so as to allow of the motion necessary of the guard-plates upon the surfaces of the belts in passing around the driving-drums. These rivets and blocks, together with ordinary rivets or countersunk bolts, are to be applied to the guard-plates at suitable distances apart and in any desired positions; and it will be apparent that this mode of construction causes the surfaces of the guard-plates to be sufficiently smooth and free from projections to adapt the same to the ordinary circumstances of use.

Where the belt is supported the wheels K are made use of, the same being provided with axles in the bearings K', and the horizontal wheels L upon vertical pivot-shafts in sockets L' serve to support the belt in a vertical position, one set of wheels being at opposite sides of the middle line of guard-plates and the next set at opposite sides of the lower lines of guard-plates; but when the belt is suspended the wheels will be at opposite sides and act beneath the top lines of guard-plates, as seen in Figs. 5 and 6. In either instance there is a free edge of the belt that can be made use of for the grip or other connection between the cars and the traction-belt.

The conical wheels shown in Fig. 6 may be used to support the hanging belt, or else the cylindrical wheels shown in Fig. 5 may be used, and such wheels may extend in the form shown in dotted lines.

The horizontal wheels and their axes can be easily lifted out of their sockets for oiling or repairs, and the sockets are made with a flaring rim around the top to retain the oil, and with a recess between the upper and the lower bearings in the sockets, so that the oil will be retained therein. There should be a hole or a channel through the upper bearing for the oil to pass into the recess.

The belts of steel are to be lapped and brazed, so as to form continuous lengths of uniform strength.

We claim as our invention—

1. The combination, with the endless belt composed of two or more thicknesses of sheet metal, of guard-plates upon the outer surfaces and attaching-rivets, there being spaces between the ends of the guard-plates, substantially as set forth.

2. The combination, with two or more thicknesses of sheet metal connected up to form an endless traction-belt, of guard-plates having diagonal ends and attaching-rivets, substantially as set forth.

3. A traction-belt composed of two or more thicknesses of sheet metal, in combination with guard-plates applied to the surfaces of the belt, dovetail blocks, and rivets for uniting the respective parts, the blocks passing into elongated dovetail slots, substantially as set forth.

4. The traction-belt for railways, composed of sheet-metal plates brazed together to form endless belts and united in two or more layers by rivets, substantially as set forth.

Signed by us this 26th day of February, A. D. 1886.

J. H. PENDLETON.
CORNELIUS TIERS.

Witnesses:
GEO. T. PINCKNEY,
WILLIAM G. MOTT.